US012686358B2

(12) United States Patent
    Fuentes Domingo

(10) Patent No.: US 12,686,358 B2
(45) Date of Patent: Jul. 21, 2026

(54) SEAT BELT GUIDE

(71) Applicant: Illinois Tool Works Inc., Glenview, IL (US)

(72) Inventor: Ismael Fuentes Domingo, Sabadell (ES)

(73) Assignee: Illinois Tool Works Inc., Glenview, IL (US)

( * ) Notice: Subject to any disclaimer, the term of this patent is extended or adjusted under 35 U.S.C. 154(b) by 89 days.

(21) Appl. No.: 18/668,895

(22) Filed: May 20, 2024

(65) Prior Publication Data

US 2024/0391414 A1      Nov. 28, 2024

(30) Foreign Application Priority Data

May 22, 2023    (EP) ..................................... 23382475
May 9, 2024     (EP) ..................................... 24175043

(51) Int. Cl.
    B60R 22/18              (2006.01)
(52) U.S. Cl.
    CPC ...... B60R 22/18 (2013.01); B60R 2022/1818 (2013.01); B60R 2022/1831 (2013.01)
(58) Field of Classification Search
    CPC ............ B60R 22/18; B60R 2022/1818; B60R 2022/1831; B60R 2022/1837; B60R 22/24
    USPC ............................ 280/801.1, 801.2; 242/397
    See application file for complete search history.

(56) References Cited

U.S. PATENT DOCUMENTS 5,280,959  A  *   1/1994  Nanbu ................... B60R 22/203
                                                          297/483
6,234,529  B1 *   5/2001  Ellison ................... B60R 22/24
                                                          296/210
7,296,854  B2 *  11/2007  Lentz ................... B60N 2/2866
                                                          296/68.1
11,572,031 B2 *   2/2023  Wolf ....................... B60R 22/18
11,628,799 B2 *   4/2023  Sbongk ................... B60R 22/18
                                                          280/801.1
2004/0080194 A1 *  4/2004  Medvecky ........... B60N 2/2887
                                                          297/253
2008/0030013 A1 *  2/2008  Burghardt .............. B60R 22/26
                                                          297/483

(Continued)

FOREIGN PATENT DOCUMENTS

CN        211731316 U   * 10/2020   ............ B60R 22/18
CN        114074635 A     2/2022

(Continued)

OTHER PUBLICATIONS

Communication pursuant to Article 94(3) EPC for European Application No. 24 175 043.9-1009, dated Jun. 12, 2025, European Patent Office, Germany (6 pages).

*Primary Examiner* — Emmanuel M Marcelo

*Assistant Examiner* — Raveen J Dias

(74) *Attorney, Agent, or Firm* — McAndrews, Held & Malloy, Ltd.

(57)                ABSTRACT

The present disclosure relates to a seat belt guide comprising a guide portion for slidably retaining a seat belt and at least one connecting portion for attaching the seat belt guide to a frame. The at least one connecting portion comprises at least one barb and at least one stop. The barb is arranged in opposition to the at least one stop. The barb comprises a biting surface. The barb is resiliantly biased in a direction different to a direction that the biting surface is arranged to bite in.

14 Claims, 6 Drawing Sheets

(56)                    References Cited

U.S. PATENT DOCUMENTS

| | | | | |
|---|---|---|---|---|
| 2008/0211278 | A1 * | 9/2008 | Macliver ............. | B60N 2/2812 |
| | | | | 297/464 |
| 2012/0219381 | A1 * | 8/2012 | Fuentes Domingo ...................... | |
| | | | | F16B 37/0842 |
| | | | | 411/427 |
| 2021/0362671 | A1 * | 11/2021 | Wolf ....................... | B60R 22/18 |
| 2022/0055571 | A1 * | 2/2022 | Sbongk ................... | B60R 22/12 |
| 2025/0236256 | A1 * | 7/2025 | Inoue ...................... | B60N 2/42 |

FOREIGN PATENT DOCUMENTS

| | | | | | |
|---|---|---|---|---|---|
| DE | 102006061617 | A1 * | 7/2008 | ............ | B60R 22/24 |
| DE | 102010023662 | A1 * | 1/2011 | ............ | B60R 22/24 |
| DE | 102010051483 | A1 * | 5/2012 | ............ | B60R 22/24 |
| DE | 102011119676 | A1 * | 5/2013 | ............ | B60R 22/24 |
| DE | 102004041665 | B4 * | 1/2015 | ............ | B60R 22/34 |
| DE | 102013018525 | B4 * | 8/2015 | ............ | B60R 22/24 |
| FR | 2926046 | A1 * | 7/2009 | ............ | B60R 22/24 |
| JP | 2011085174 | A  * | 4/2011 | ............ | B60R 22/24 |
| WO | WO-2020123064 | A1 * | 6/2020 | ............ | F16B 21/086 |

* cited by examiner (A)

(B)

(A)

R8.00

208

210

(B)

208

Y

X

210

(C)

208

210

(A)

(B)

SEAT BELT GUIDE

RELATED APPLICATIONS

The present application claims the benefit of European Patent Application Nos. 23382475.4, filed May 22, 2023, and 24175043.9, filed May 9, 2024, each titled "A Seat Belt Guide," the contents of which are hereby incorporated by reference.

TECHNICAL FIELD

The present disclosure generally relates to a seat belt guide. The present disclosure generally relates to the field of fasteners, and in particular, to the fields of fastening clips for attaching one or more components, such as, for example, seat belt guide loops for a vehicle.

BACKGROUND

Seat belt guides are known in the art and common brackets are used to attach a supplier's seat belt module to, for example, a vehicles B-pillar (see FIG. 1). The prior art brackets require a relatively complex assembly including keyholes at the bracket, screws and/or a welded nut provided on the B-Pillar ("frame" 104).

Known assemblies require a multi-step process (hang parts, fit bolt, align and tighten bolt). Alignment is done with a second hand using power tools. The use of such power tools risks damage to the seat belt 102 ("belt"), such as burning. Burning of the belt, even for micro-seconds, may result in the belt not fulfilling crash test requirements.

Consequently, it is an object of the present disclosure to provide an improved seat belt module or fastener with a seat belt guide loop that is robust, lightweight and fit for purpose, with an improved ease of use, as well as, reduced manufacturer costs.

SUMMARY

The present disclosure relates generally to a seat belt guide, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
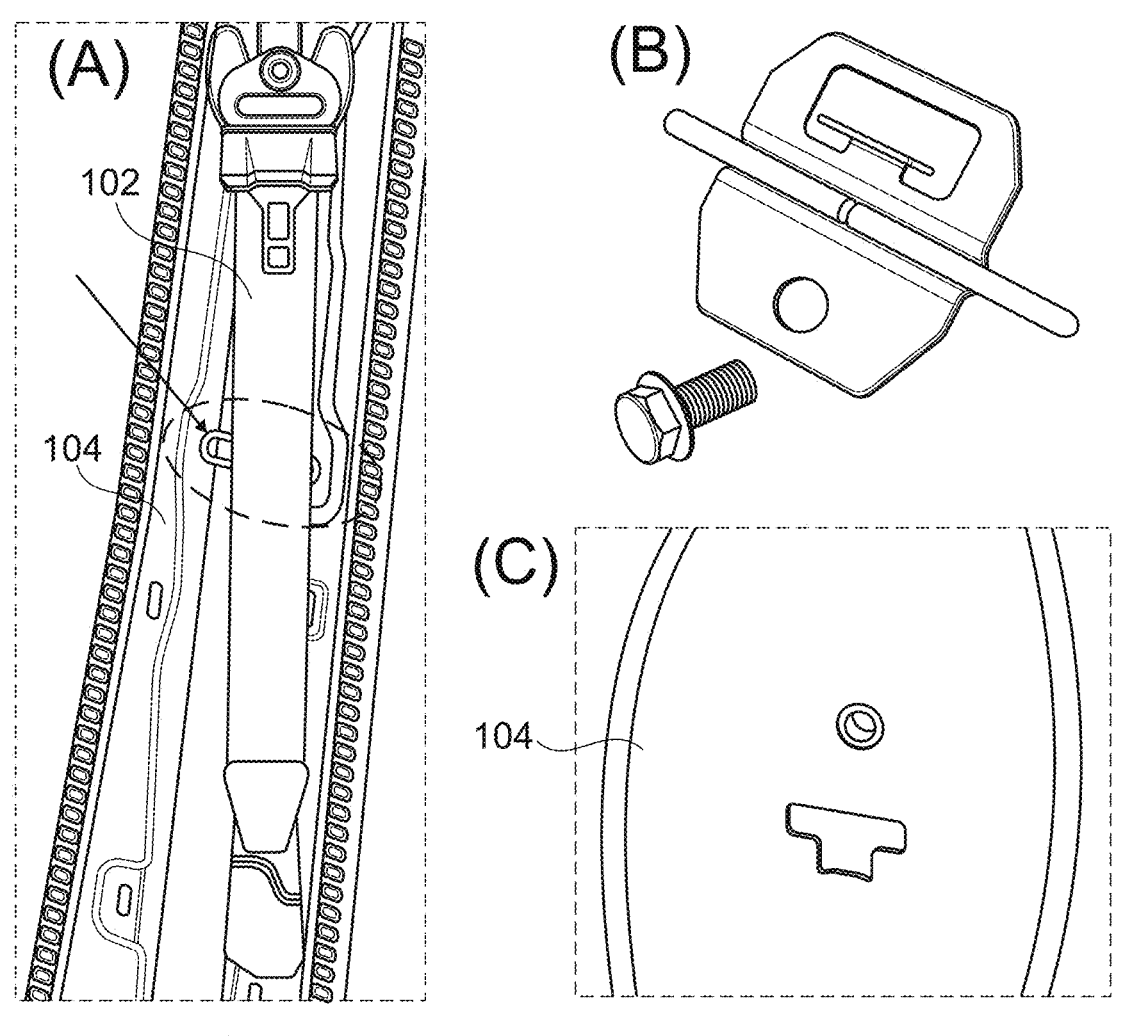
FIG. 1 illustrates (a) a close-up of a seat belt system and a known guide module attached to a B-pillar of a vehicle, as well as, (b) a known guide bracket and screw assembly and (c) B-pillar keyhole and welded nut for a known seat belt system, and (d) an attached known bracket and seat belt guide mounted to the B-pillar of a vehicle.
Figure 1:
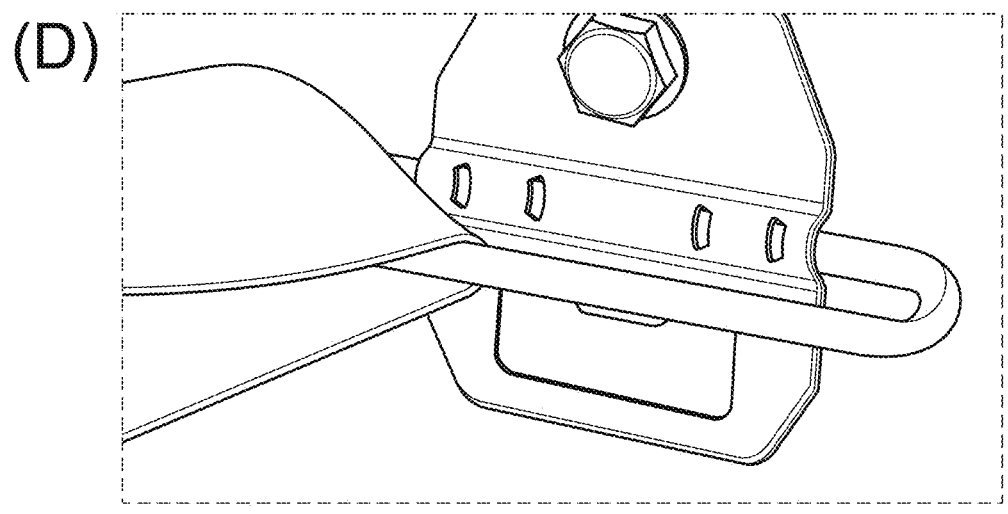

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

According to the disclosure there is provided a seat belt guide comprising: a guide portion for slidably retaining a seatbelt; at least one connecting portion for attaching the seat belt guide to a frame; wherein the at least one connecting portion comprises at least one barb and at least one stop; wherein the barb is arranged in opposition to the at least one stop; and wherein the barb comprises a biting surface, and the barb is resiliently biased in a direction different to a direction that the biting surface is arranged to bite in. Advantageously, the barb and stop are sufficient in themselves to adequately attach the seat belt guide to the frame.

No further fixings or work is required (such as welding). The seat belt guide may be attached to the frame by hand with no additional tooling required.

Suitably, the guide portion comprises a seat-belt receiving aperture. The seat belt guide may be pre-attached to a seat belt, with the seat belt passing through the aperture.

Optionally, the seat-belt receiving aperture comprises a continuous wall about a perimeter of the seat-belt receiving aperture. The seat belt may be passed through the aperture upon construction, such that the seat belt cannot be removed or pass by the continuous wall without disassembly or destructions of the seat belt (e.g., by cutting the belt).

Appositely, the seat belt guide comprises at least two connecting portions. Multiple connecting portions may be used to ensure an adequate attachment of the seat belt guide or to accommodate alternative designs of seat belt guide, such as one where a single guide portion is straddled by at least two connecting portions. Likewise, multiple seat belt guides may be attached to one or more connecting portions which may be useful in situations where multiple seat belts are located in close proximity, such as the middle seats of a bench of seats in a vehicle.

Suitably, the connecting portion is arranged, in use, to straddle a wall of a frame, with the at least one barb on a first side of the wall and the at least one stop on a second face of the wall, wherein the second face is opposite to the first side. In this way the wall of the frame is pinched between the biting surface of the at least one barb and the stop, ensuring that the frame is grasped by the connecting portion.

Optionally, the at least one barb and the at least one stop are spaced apart by a distance which is less than a thickness of a frame wall. Reducing the space between the biting surface of the barb and the at least one stop ensures that the bard bites the frame sufficiently to ensure a stead-fast grip, or even that the barb bites into the frame material.

Appositely, the at least one stop is resiliently biased. The stop may be sprung such that vibrations in the frame or movement of the seat guide (such as by nefarious or mischievous persons urging the seat guide away from the frame) are resisted and a secure fit of the seat belt guide to the frame is maintained.

Suitably, the at least one stop is resiliently biased, in use, towards the frame. In this way the pinching of the frame by the barb and the stop is enhanced as both the barb are stop are urged towards the frame in opposing directions, thereby forming a pincer grip.

Optionally, the barb comprises a ramped surface arranged to engage with the frame. The biting surface may be continuous with, or formed by, the ramped surface. The ramped surface provides a tolerance to the connecting portion to accommodate a variety of thicknesses of frame wall, either by design (some frames may be formed of thicker materials than others) or to accommodate relaxed design tolerances. The ramp ensures that the biting surface of the barb at least partially engages with the frame at a location along the ramped surface.

Appositely, the at least one connecting portion is formed in a single piece. Manufacture of the connecting portion is simplified and the risk of the connecting portion disassembling is avoided. A user of the connecting portion also avoids the need to assemble the connecting portion thereby saving time.

Suitably, the seat belt guide is formed in a single piece. Manufacture of the seat belt guide is simplified and the risk of the seat belt guide disassembling is avoided. A user of the seat belt guide also avoids the need to assemble the seat belt guide thereby saving time.

Optionally, the seat belt guide is formed of one or more metals. As the seat belt is a safety critical element in a vehicle an appropriate material must be selected to ensure adequate function is maintained, should the seat belt ever be required.

Appositely, the structure of the seat belt guide consists of one or more metals. The structure here refers to those elements which form the seat belt guide, which is at least the guide portion and connecting portion. Surface finishes and treatments or aspects which are co-incident to the main purpose of the seat belt guide (that is to act as a guide for a seat belt), are to be considered as "non-structural". Preferably the entire seat belt guide is formed from a single metal.

Suitably, the seat belt guide is partially or wholly formed by stamping. The seat belt guide may be formed in a single manufacturing step in order to quickly produce a high volume easily.

Optionally, the at least one stop is arranged on the at least one barb. Arranging the stop so that it is connected to the barb ensures that the stop is located optimally relative to the barb on use of the seat belt guide.

Suitably, the connecting portion grasps at least one leg of the guide portion preventing rotation and/or translational movement of the guide portion relative to the connecting portion. This ensures the guide portion is held in a single and predictable position when in place on the frame.

Further, as used herein, the terms 'connected', 'attached', 'coupled' and 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second" and "third" etc. merely indicate that different instances of like objects are being referred to and are not intended to imply that the objects so described must be in a given sequence, either temporally, spatially, in ranking or in any other manner.

Like reference numerals are used to depict like features throughout.

Figure 2:
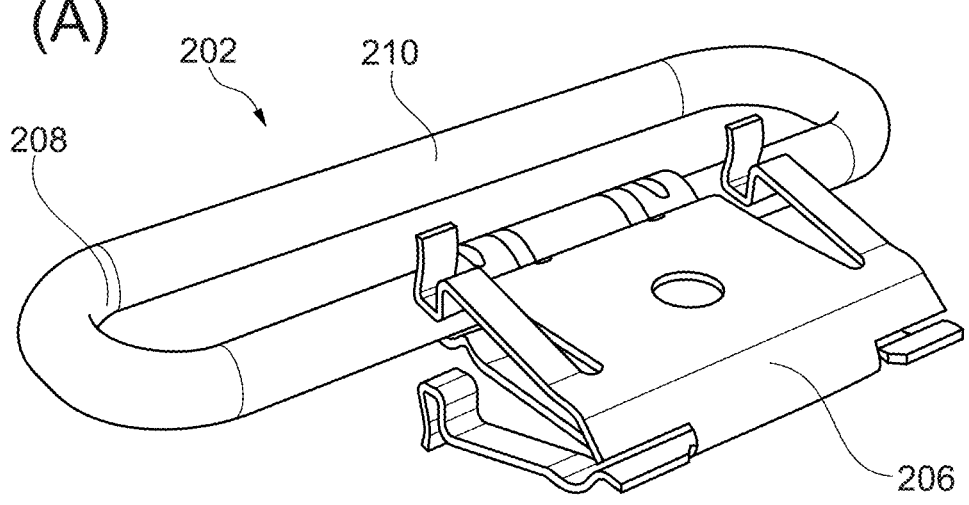
FIG. 2 illustrates (a) a perspective side view of a fastener and seat belt guide of the present disclosure, and (b) a perspective side view of the fastener and seat belt guide when coupled with a seat belt, in situ.
Figure 2:
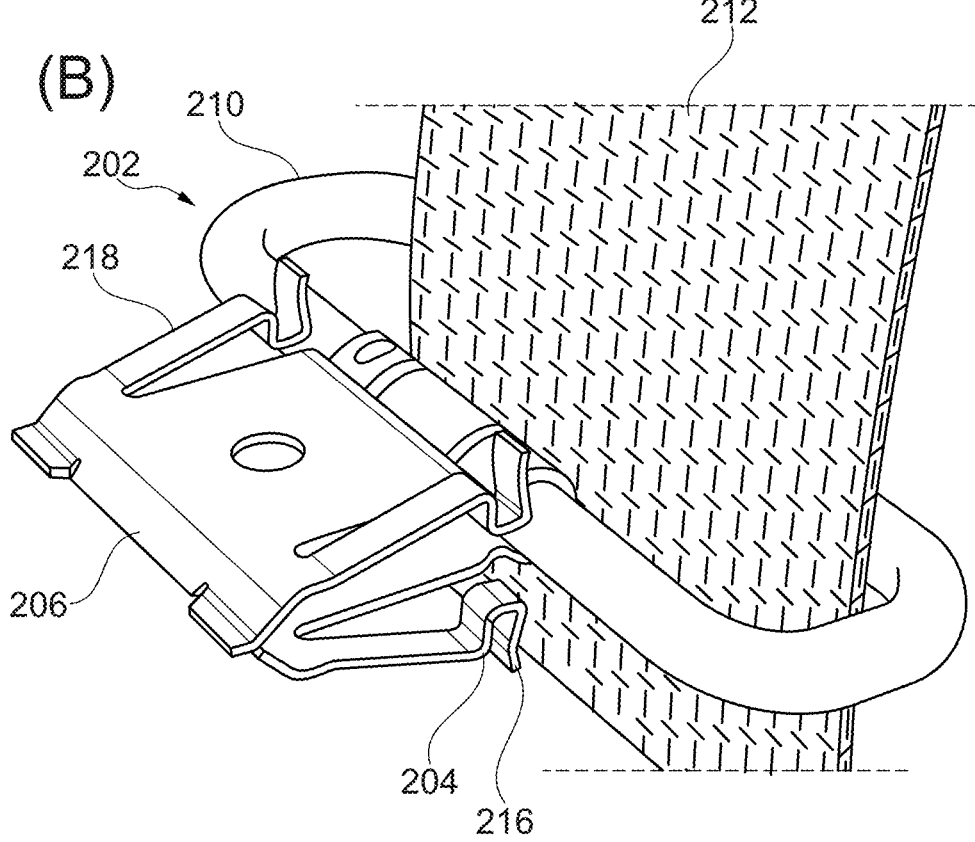

The illustrated example of FIG. 2 relates to a seat belt guide 202 used for the assembly of vehicle components. In particular, the seat belt guide 202 of the present disclosure includes a connecting portion 206 operably mountable with respective apertures in, for example, a B-pillar of a vehicle ("frame"), in order to provide a seat belt guide for an assembled and installed seat belt system (as shown in FIG. 2).

The drawings illustrate a new screwless design for the fastener ("connecting portion" 206) and guide loop ("guide portion" 210, for the seat belt). The connecting portion 206 is provided by a stamped sheet metal that is folded so as to moveably retain a guide portion 210 for a seat belt 212. A body portion extends along a central axis (in line with or parallel to the direction of insertion into the aperture during assembly) and respective resilient leg members extend laterally outward from a distal portion of the fastener body and in a direction toward the guide loop, so as to form a V-shaped spring clip arrangement.

Each one of the resilient leg members has a U-shaped retainer member arranged on its distal end. The U-shaped retainer member is arranged with its open end facing laterally outward, such that the U-shaped retainer members can retainingly engage with the side wall of the pillar aperture in order to securely but (easily) removably attach the fastener to the pillar wall.

In other words, the resilient leg members form barbs 218 having a biting surface 204 which grasp the frame when inserted. Also attached to the resilient leg members (and therefore the barbs 218) are respective stops 216 which abut an opposing face of a frame wall, opposite the site bitten by the biting surface 204 of the barb 218.

Figure 3:
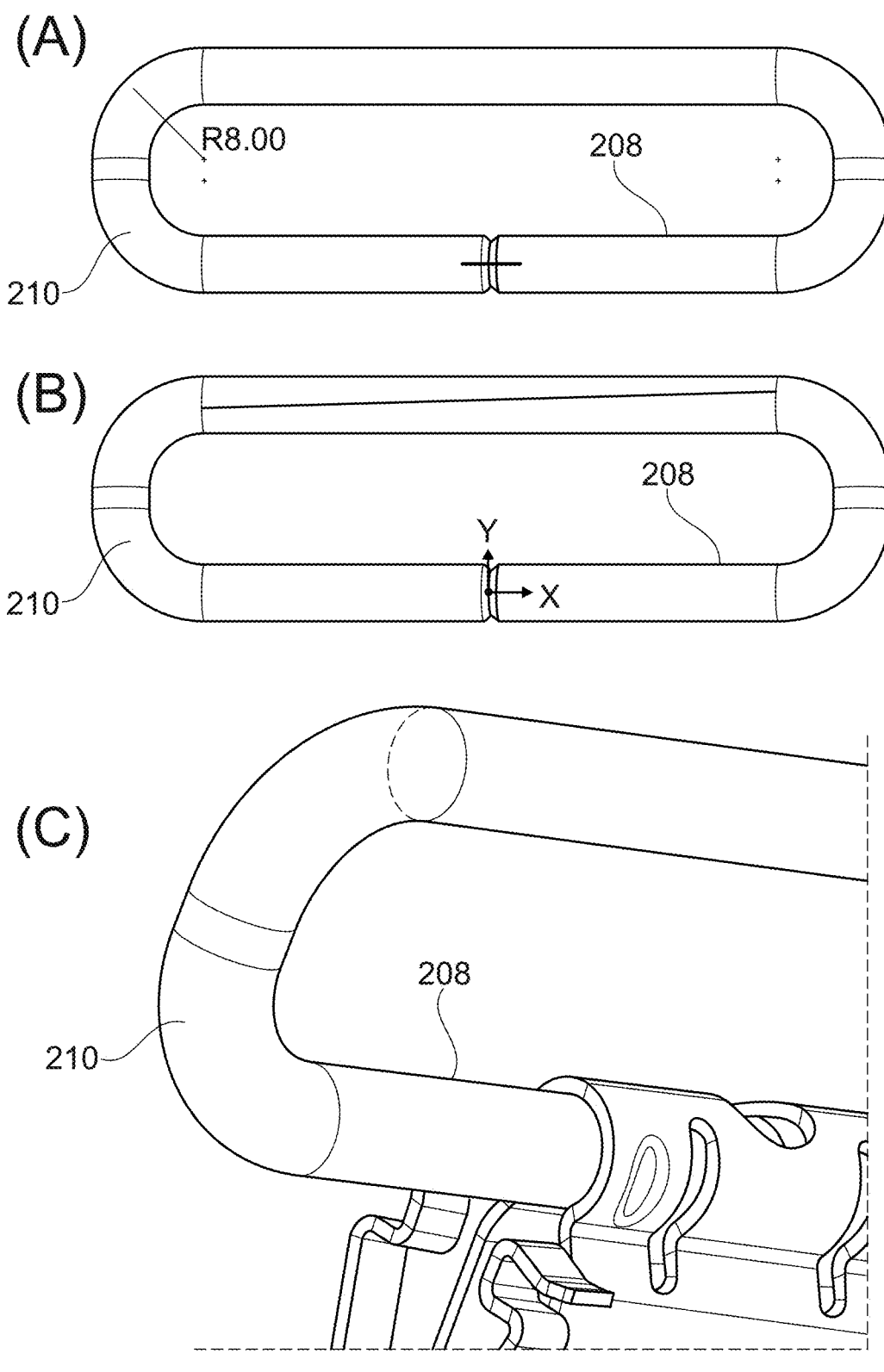
FIG. 3 illustrates the loop guide and example dimensions (a), (b) in a front view and (c) a part-close-up view, in situ.
Figure 4:
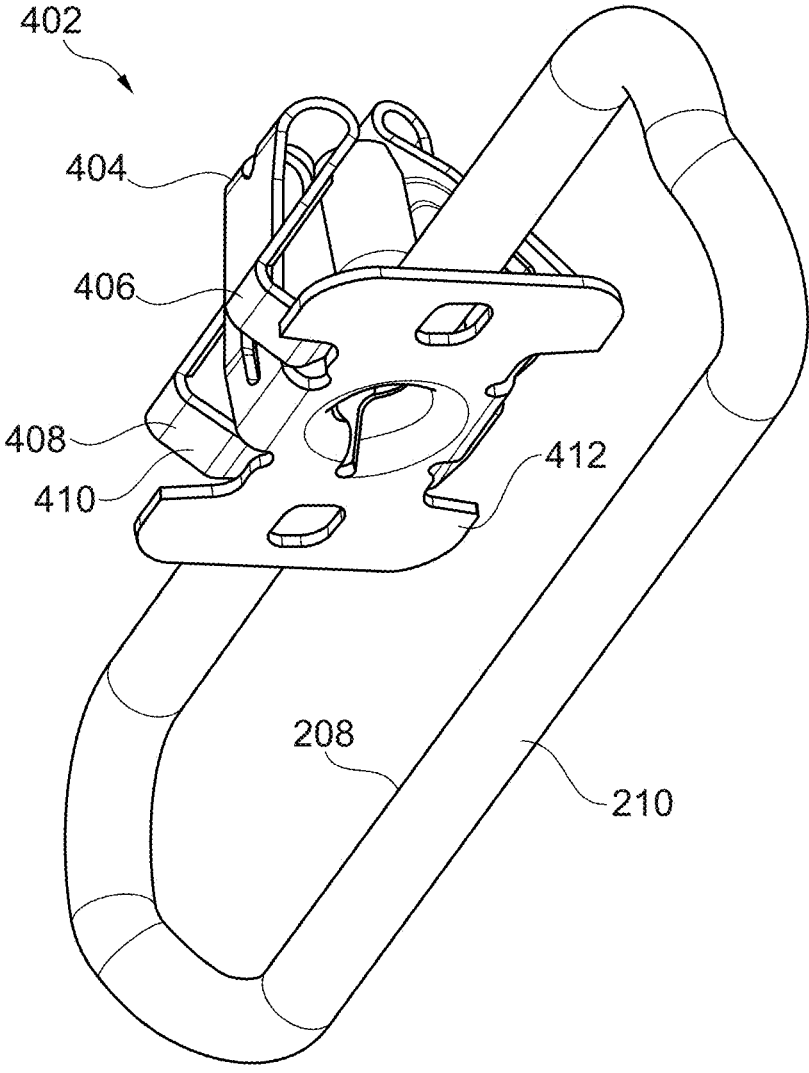
FIG. 4 illustrates an alternative example of a seat belt guide.

FIG. 3 shows a detailed example (incl. dimensions) of the guide portion 210 and the sheet metal blank ready to be formed into the fastener clip. The guide portion 210 has an aperture through which a seat belt may be passed. The aperture is bounded by a continuous wall 208 about a perimeter of the aperture. In this way the seat belt is captured within the aperture and may not escape or detach from the guide portion 210 without intentional disassembly (destructive or otherwise). Providing the guide portion 210 as a metal loop FIG. 4 shows an alternative seat belt guide 402 also comprising a guide portion 210 formed of a loop and sharing like features with the guide portion 210 shown in FIG. 2 and FIG. 3.

The connecting portion 404 is formed of a plate. The plate may be formed of metal. The connecting portion 404 may be formed in a stamping process. The connecting portion 404 has a stop 412 arranged to abut a frame once installed and prevent further movement of the seat belt guide 402 into the frame apertures. Opposing the stop 412 are one or more barbs 406. Each barb 406 has a biting surface 408 arranged to bite the frame when the seat belt guide 402 is inserted into a frame aperture and pinch the frame between the biting surface 408 and the stop 412. The biting surface 408 is arranged upon a ramped surface 410. The ramped surface 410 ensures that the biting surface of the barb at least partially engages with the frame at a location along the ramped surface as described elsewhere in this disclosure.

Figure 5:
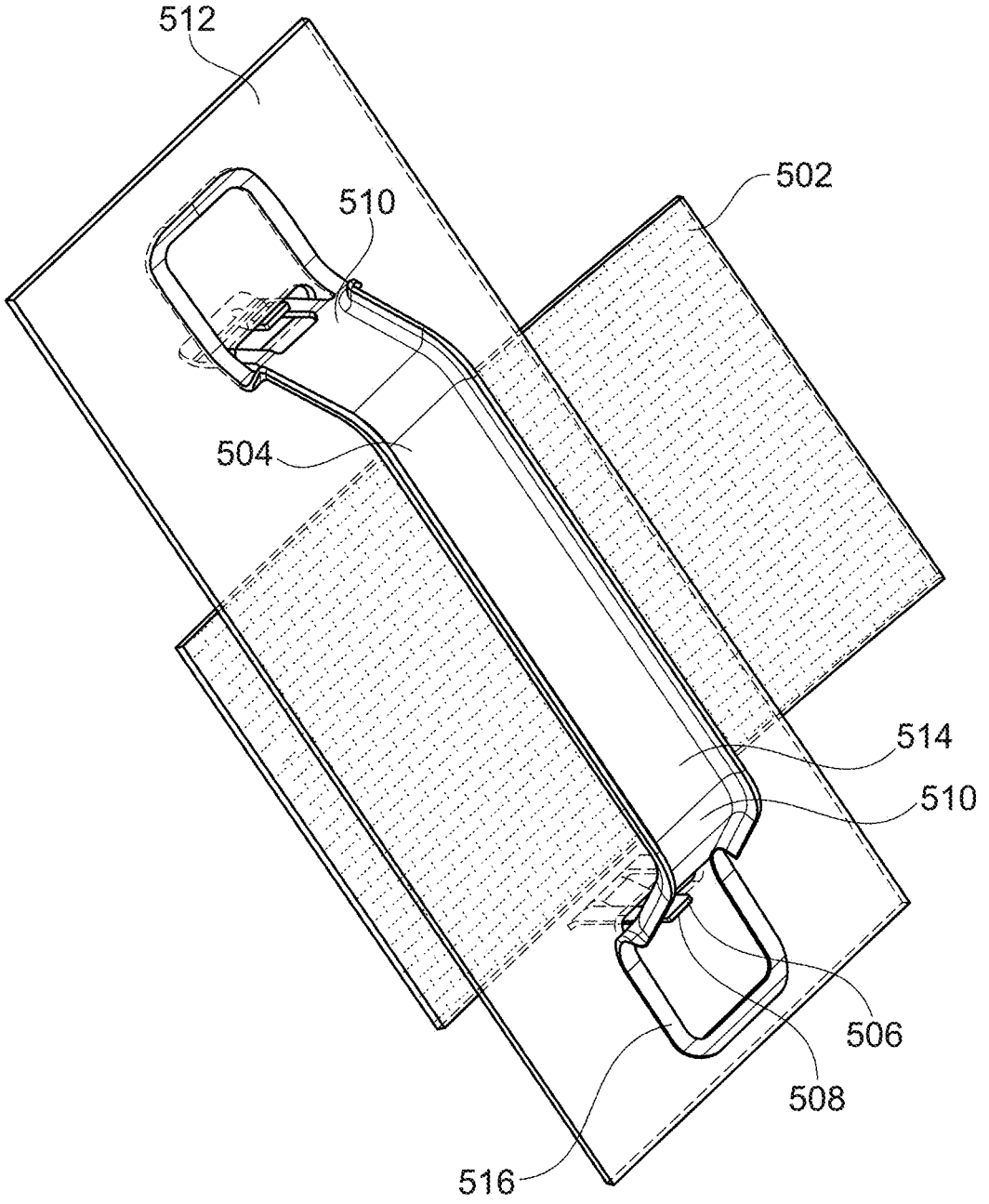
FIG. 5 illustrates an alternative example of a seat belt guide.

FIG. 5 shows an alternative seat belt guide 504 attached to a frame 512 (in partial transparency for illustrative purposes) and retaining a seat belt 502. The seat belt guide 504 has a guide portion 514 formed of a strip of material (typically metal) with a connecting portion 510 located at each end of the 514.

The guide portion 514, when in position upon the frame 512 retains the seat belt 502 between the guide portion 514 and the frame 512. The seat belt 502 is not captured by the guide portion 514 unlike the seat belt guides of FIG. 2 and FIG. 4. The present seat belt guide 504 may be attached separately to the seat belt 502.

Two connecting portions 510 are required to attach both ends of the guide portion 514 to the frame 512 in order to ensure the seat belt 502 is retained by the 504. Each connecting portion 510 comprises a barb 506 having a biting surface 508 which bites the frame 512 when in position. A stop 516 is provided to abut the frame 512 on an opposing surface to that bitten by the barb 506 and thereby hold the seat belt guide 504 in place by pinching the frame 512 between the barb 506 and the stop 516.

Figure 6:
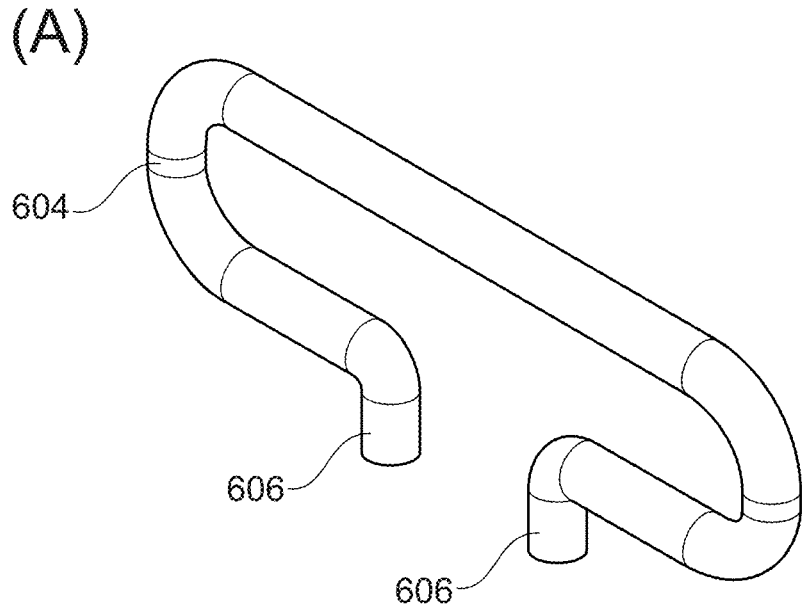
FIG. 6 illustrates (a) a partial ring for a seat belt guide and (b) an alternative example of a seat belt guide.
Figure 6:
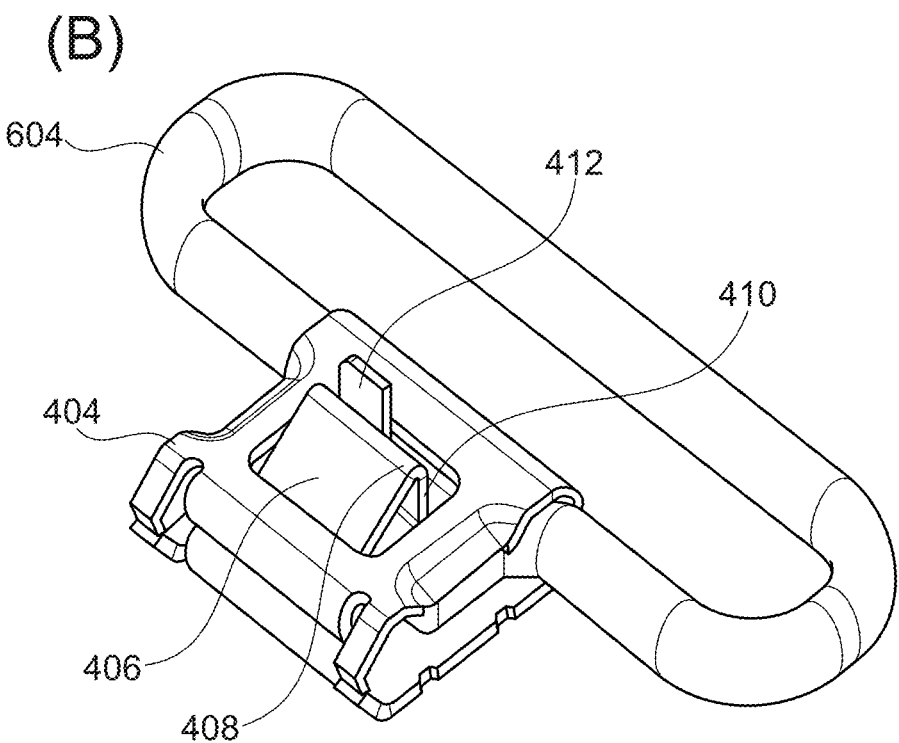

FIG. 6 shows an alternative seat belt guide similar to that shown in FIG. 4 and sharing similar attributes (like numbering provided as appropriate for shared features). Features are also shared with the guide portion 210 shown in FIG. 2 and FIG. 3. The seat belt guide 604 is formed having at least one leg 606 attached. The seat belt guide 604 may be formed of a single piece with the leg 606 formed by bending or otherwise deforming a part of the seat belt guide 604 to form the leg 606. Alternatively, the one or more legs 606 may be added separately to a pre-formed seat belt guide 604. The seat belt guide 604 is shown as an open ring-like structure, but may be formed of an enclosed ring, similar to that shown in FIG. 3, and with one or more legs 606 added later.

The connecting portion 404 is provided with internal space to receive the one or more legs 606 of the seat belt guide 604. The connecting portion 404 is formed over the one or more legs 606 thereby grasping and holding the legs in a fixed position relative to the connecting portion 404. The connecting portion 404 is provided with multiple arresting surfaces which contact the one or more legs 606 in multiple dimensions thereby arresting movement of the one or more legs 606 relative to the connecting portion 404. In this way the connecting portion 404 arrests movement of the seat belt guide 604 relative to the connecting portion 404 preventing rotation and translational movement of the seat belt guide 604 relative to the connecting portion 404.

The barbs described herein may be biased in a direction away from the direction the biting surface is directed. This is to ensure, that when passed through the frame aperture the barbs move away from the aperture to place the biting surface above the frame material rather than the empty space of the aperture, thereby assuring a successful bite by the barb.

The stops described herein may be biased towards the barbs by, for example, using a sprung or otherwise resilient material. This ensures that the barb and stop are together urged towards the frame material further ensuring a successful pinching of the frame material and allowing the seat belt guide to successfully attach.

The new fastener for the seat belt systems disclosed herein are robust and allow a smooth movement (coated metal surface) during installation. It is easy to use when assembled or disassembled, thus, improving productivity through faster assembly speed (Poka-yoke & anti-rotation feature through a rectangular hole/aperture). No welding or installation tools are required during assembly/mounting. The fastener is made up of a single component, rather than multiple components (screws, nuts etc.) that are need for currently known brackets. In addition, the simple construction (thin sheet metal stamped and folded, i.e. less parts) allows for a lighter solution that what is currently available.

Any suitable, resilient and formable material may be used for the seat belt guide and fastener portion, as well as, the guide loop. Metals are particularly suitable due to the intended safety purpose of the device. It is advantageous to form the seat belt guide from a single metal for simplicity of manufacture.

It will be appreciated by persons skilled in the art that the above detailed examples have been described by way of example only and not in any limitative sense, and that various alterations and modifications are possible without departing from the scope of the disclosure as defined by the appended claims. Various modifications to the detailed examples described above are possible.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract or drawings), or to any novel one, or any novel combination, of the steps of any method or process so disclosed.

What is claimed is:

1. A seat belt guide comprising:

a guide portion for slidably retaining a seat belt; and at least one connecting portion for attaching the seat belt guide to a frame;

wherein the at least one connecting portion comprises at least one barb and at least one stop, wherein the at least one barb is arranged in opposition to the at least one stop, wherein the at least one barb comprises a biting surface, and the at least one barb is resiliently biased in a direction different to a direction that the biting surface is arranged to bite in, and wherein the at least one barb comprises a ramped surface arranged to engage with the frame.

2. The seat belt guide of claim 1, wherein the guide portion comprises a seat-belt receiving aperture.

3. The seat belt guide of claim 2, wherein the seat-belt receiving aperture comprises a continuous wall about a perimeter of the seat-belt receiving aperture.

4. The seat belt guide of any one of claim 1, wherein the seat belt guide comprises at least two connecting portions.

5. The seat belt guide of claim 1, wherein the at least one connecting portion is arranged, in use, to straddle a wall of the frame, with the at least one barb on a first side of the wall and the at least one stop on a second face of the wall, wherein the second face is opposite to the first side.

6. The seat belt guide of claim 1, wherein the at least one barb and the at least one stop are spaced apart by a distance which is less than a thickness of a frame wall of the frame.

7. The seat belt guide of claim 6, wherein the at least one stop is resiliently biased.

8. The seat belt guide of claim 7, wherein the at least one stop is resiliently biased, in use, towards the frame.

9. The seat belt guide of claim 1, wherein the at least one connecting portion is formed in a single piece.

10. The seat belt guide of claim 1, wherein the seat belt guide is formed in a single piece.

11. The seat belt guide of claim 1, wherein the seat belt guide is formed of one or more metals.

12. The seat belt guide of claim 1, wherein a structure of the seat belt guide consists of one or more metals.

13. The seat belt guide of claim 1, wherein the seat belt guide is partially or wholly formed by stamping, and wherein the at least one stop is arranged on the at least one barb.

14. The seat belt guide of claim 1, wherein the at least one connecting portion grasps at least one leg of the guide portion preventing rotation and/or translational movement of the guide portion relative to the at least one connecting portion.

* * * * *